United States Patent

Sekiguchi et al.

[11] Patent Number: 5,862,762
[45] Date of Patent: Jan. 26, 1999

[54] METHOD AND FACILITY FOR REFUSE INCINERATION USING A FIRE-GRATE-TYPE INCINERATOR AND WITH SEPARATION OF NON-COMBUSTIBLES

[75] Inventors: Yoshitoshi Sekiguchi; Kunio Sasaki; Hideo Shimotani; Noboru Okigami; Hiroshi Isotani; Kenji Kaketa; Kenji Kashiwabara; Shozo Umemura; Hiroshi Onishi, all of Osaka, Japan

[73] Assignee: Hitachi Zosen Corporation, Osaka, Japan

[21] Appl. No.: 776,072
[22] PCT Filed: May 15, 1996
[86] PCT No.: PCT/JP96/01294
  § 371 Date: Jan. 8, 1997
  § 102(e) Date: Jan. 8, 1997
[87] PCT Pub. No.: WO96/36837
  PCT Pub. Date: Nov. 21, 1996

[30] Foreign Application Priority Data

May 17, 1995 [JP] Japan ................................ 7-117573

[51] Int. Cl.$^6$ .............................. F23G 5/00; F23G 5/033; F23G 5/16; B09B 3/00
[52] U.S. Cl. .................. 110/346; 110/342; 110/344; 110/347; 110/204; 110/210; 110/214; 110/219; 110/220; 110/222; 110/233; 110/234; 110/235; 110/248; 110/255; 110/263; 110/266
[58] Field of Search ................................ 110/346, 342, 110/344, 347, 348, 210, 211, 214, 218, 219, 220, 222, 224, 227, 228, 235, 243, 244, 248, 255, 104, 232, 263, 233, 234, 204, 266

[56] References Cited

U.S. PATENT DOCUMENTS

| | | |
|---|---|---|
| 3,670,669 | 6/1972 | Hoad ........................... 110/220 |
| 3,938,449 | 2/1976 | Frisz et al. ...................... 110/345 |
| 3,951,081 | 4/1976 | Martin et al. .................... 110/220 |
| 3,955,512 | 5/1976 | Martin et al. .................... 110/222 |
| 4,015,546 | 4/1977 | Paules ........................... 110/187 |
| 4,121,524 | 10/1978 | Voelskow et al. ............... 110/220 |
| 4,270,470 | 6/1981 | Barnett et al. .................. 110/346 |
| 4,682,548 | 7/1987 | Peng ............................ 110/222 |
| 4,977,837 | 12/1990 | Roos et al. ................. 110/165 A |
| 5,052,310 | 10/1991 | Goff et al. ..................... 110/234 |
| 5,372,077 | 12/1994 | Yen et al. ...................... 110/233 |

FOREIGN PATENT DOCUMENTS

| | | |
|---|---|---|
| 41197429 | 12/1992 | Germany . |
| 56-82315 | 7/1981 | Japan . |
| 61-76818 | 4/1986 | Japan . |
| 3-233207 | 10/1991 | Japan . |
| 5-113208 | 5/1993 | Japan . |
| 5-223231 | 8/1993 | Japan . |
| 5-332520 | 12/1993 | Japan . |

*Primary Examiner*—Ira S. Lazarus
*Assistant Examiner*—Ljiljana V. Ciric
*Attorney, Agent, or Firm*—Barnes, Kisselle, Raisch, Choate, Whittemore & Hulbert P.C.

[57] ABSTRACT

Combustible is comminuted and dried, and metal and non-combustible are removed from the coarsely comminuted combustible. Then, the combustible is secondarily comminuted and separated into coarse combustible and fluff which is fine combustible. The coarse combustible of the separated combustible is fed onto a fire grate (2) of a refuse incinerator (1), and burned in flat bed combustion in a primary combustion chamber (4). On the other hand, the fluff is burned in suspended combustion in a secondary combustion chamber (7) with a combustion fluff burner (5) for incinerating combustible. Thus, refuse containing much plastics which is formed into fluff can be efficiently disposed of, whereby the amount of incineration is increased as a whole.

12 Claims, 8 Drawing Sheets

METHOD AND FACILITY FOR REFUSE INCINERATION USING A FIRE-GRATE-TYPE INCINERATOR AND WITH SEPARATION OF NON-COMBUSTIBLES

FIELD OF THE INVENTION

The present invention relates to a method and facility for refuse incineration in a refuse disposal system.

BACKGROUND OF THE INVENTION

Conventionally, a refuse incineration facility for incinerating urban refuse for disposal is provided with a fire-grate-type refuse incinerator. Sometimes there is provided a fluid bed incinerator. In addition, an ash fusion furnace is often installed for reducing the volume of incineration ash discharged from the refuse incinerator and for rendering it harmless.

Recent urban refuse is characterized by an increase in the volume of plastics contained in the refuse and an increase in the amount of refuse as a whole.

The fire-grate-type refuse incinerator is very effective because refuse, other than bulky refuse, can be fed into the incinerator as is without being comminuted. However, when refuse containing plastics in an amount of 30% by weight or more is incinerated, there is the possibility that molten plastics will flow down under the fire grate to damage it or to cause a fire accident. Thus, the firegrate-type refuse incinerator has a problem in that it cannot accommodate refuse containing a large amount of plastics. Furthermore, incinerators must be made larger to accommodate increasing amounts of refuse. In a flat bed combustion system, combustion takes place on the surface of a fire grate. The fire grate may be damaged if it is required to support too large a load. Thus, the volume of refuse which can be incinerated in a typical refuse incinerator is said to be limited to 1000 tons per day.

On the other hand, the fluid bed incinerator is suitable for incineration of refuse containing a large amount of plastics because material to be incinerated is incinerated through suspended combustion while the material is caused to float and flow in a fluid layer. However, since the fluid be incinerator requires much power for breaking and fluidizing refuse, the volume to be incinerated in generally limited to 200 tons as day, and it is difficult to increase the volume.

DISCLOSURE OF THE INVENTION

The present invention is intended to provide a method and a facility for refuse incineration which can efficiently incinerate refuse containing a large volume of plastics with a fire grate incinerator, and which can dispose a large volume of refuse.

To attain this objective, a method for incinerating refuse according to the present invention comprises a preprocessing process for preprocessing combustible, said preprocessing process comprising a first comminuting step for primarily comminuting combustible; a separation step for separating metal and noncombustible from the comminuted combustible; a second comminuting step for secondarily comminuting the separated comminuted non-combustible; and a classification step for classifying the comminuted combustible into coarse combustible and fine combustible; wherein the pre-processed and formed coarse combustible is fed onto a fire grate of a refuse incinerator for combustion in a primary combustion chamber, the pre-processed and produced fine combustible being supplied as fuel to a combustion burner for a secondary combustion chamber which is provided above the primary combustion chamber of the refuse incinerator.

A refuse incineration facility according to the present invention comprises a pre-processing facility comprising a first comminutor for primarily comminuting combustible, a metal sorter for sorting metal from the comminuted combustible, a non-combustible separator for separating non-combustible from the comminuted combustible, a secondary comminutor for comminuting coarse combustible after the separation, and a classifier for classifying the secondarily comminuted combustible into coarse combustible and fine combustible; a refuse incinerator formed with a primary combustion chamber on a fire grate for incinerating the combustible processed in the pre-processing facility, and with a secondary combustion chamber thereabove; a coarse combustible supply line for supplying the coarse combustible separated by said classifier to the primary combustion chamber of the refuse incinerator; and a fine combustible incineration supply line for supplying as fuel said fine combustible to a combustion burner mounted in the second combustion chamber of the refuse incinerator.

With the above arrangement, the coarse combustible is flat bed burned on the fire grate in the primary combustion chamber, and the fine combustible is burned in suspended combustion by a combustion burner in the secondary combustion chamber, whereby most of plastics is easily comminuted and can be burned in suspended combustion in the secondary combustion chamber, and, thus, refuse even with plastics content of 30% by weight or more can be sufficiently burned. In addition, since the refuse can be incinerated in both the primary and secondary combustion chambers, the volume of refuse being incinerated can be significantly increased as compared to refuse incinerators which perform flat bed combustion only on the fire grate.

In addition, it is possible to stabilize flame, and to improve combustion efficiency.

DESCRIPTION OF THE EMBODIMENTS

Figure 1:
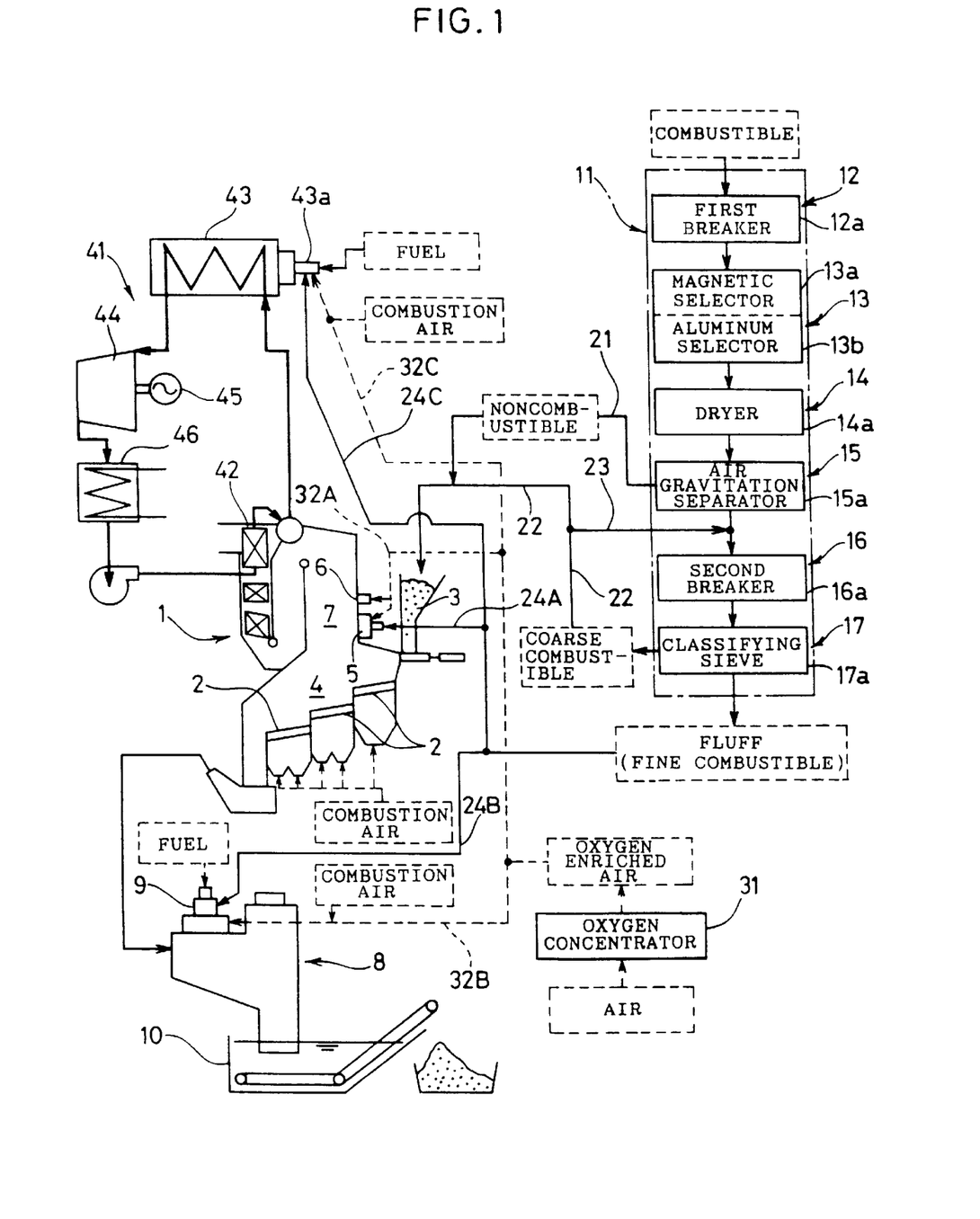
FIG. 1 shows an arrangement of a refuse incineration facility in an embodiment according to the present invention.

Referring to FIG. 1, a refuse incinerator 1 comprises a primary combustion chamber 4 for flat bed combustion of coarse combustible on a plurality of fire grates 2 fed from a hopper 3. The incinerator also comprises a secondary combustion chamber 7 for suspended combustion of fine combustible with a combustion fluff burner 5 and a secondary air nozzle 6 above the primary combustion chamber 4.

An ash fusion furnace 8 installed together with the refuse incinerator 1 is provided with a fusion fluff burner 9 and a slag cooling chamber 10. The fusion fluff burner 9 heats and melts incineration residue discharged from the refuse incinerator 1. The generated molten slag is water cooled in the slag cooling chamber 10 to form granulated slag for reducing its volume and rendering it harmless.

An electric power generation facility 41 installed together with the refuse incinerator 1 is provided to recover exhaust gas exhausted from the refuse incinerator 1 and to generate electric power. The electric power generation facility 41 comprises a superheater 42, which is a boiler, for recovering heat from the exhaust gas exhausted from the refuse incinerator 1, and independent superheater 43 for obtaining high power by superheating the steam obtained by the superheater 42, a steam turbine 44 rotatably driven by the high temperature steam from the independent superheater 43, a generator 45 which is started by the steam turbine 44, and an exhaust heat recovery unit 46. The independent superheater 43 is provided with a superheating fluff burner 43a which is a superheating burner.

A pre-processing facility 11 for preprocessing collected refuse before it is fed into the refuse incinerator 1 comprises a first breaker or comminutor 12a for preforming a first breaking or comminuting process 12 in which combustible is broken down into a size of about 50–80 mm, a magnetic selector 13a and an aluminum selector 13b for preforming a metal selection process 13 in which metal is removed from the combustible broken by the first breaker 12, a dryer 14a for performing a drying process 14 in which the combustible, after selection, is dried, and air gravitation separator 15a for performing a non-combustible separation process 15 in which non-combustible is separated from the dried combustible, a second breaker or comminutor 16a for performing a second breaking or comminuting process 16 in which combustible after separation is further comminuted, and a classifying sieve 17a for performing a classification process 17 in which the broken combustible is classified into fine combustible which is 5 mm or less in size (hereinafter called "fluff") and coarse combustible which is larger than 5 mm.

Between the preprocessing facility 11, and the refuse incinerator 1, the ash fusion furnace 8 and the electric power generation facility 41, there are provided a non-combustible supply line 21 for supplying the non-combustible separated by the non-combustible separation process 15 into the hopper 3 of the refuse incinerator 1; a coarse combustible supply line 22 for supplying the coarse combustible separated by the classification process 17 to the hopper 3 of the refuse incinerator 1; a re-breaking line 23 for sometimes supplying parts of the coarse combustible to the second breaking or comminuting process 16 again; a fine combustible incineration supply line 24A for supplying the fluff separated by the classification process 17 as fuel to the combustion fluff burner 5 of the refuse incinerator 1; a fine combustible fusion supply line 24B for supplying the fluff separated by the classification process 17 as fuel to the fusion fluff burner 9 of the ash fusion furnace 8; and a fine combustible superheating supply line 24C for supplying the fluff separated by the classification process 17 as fuel to the superheating fluff burner 43a of the electric power generation facility 41.

There is an oxygen concentrator 31 for concentrating oxygen concentration in the air to about 30%. The refuse incineration facility comprises a combustion-enriched air supply line 32A for supplying oxygen-enriched combustion air in which oxygen concentration is concentrated to about 30% as combustion air from the oxygen concentrator 31 to the secondary air nozzle 6 and the combustion fluff burner 5 of the refuse incinerator 1; a fusion-enriched air supply line 32B for supplying oxygen-enriched air from the oxygen concentrator 31 to the fusion fluff burner 9 of the ash fusion furnace 8; and a superheating enriched air supply line 32C for supplying oxygen-enriched air from the oxygen concentrator 31 to the superheating fluff burner 43a of the electric power generation facility 41.

With the above arrangement, combustible collected as combustible refuse of classified and collected urban refuse is primarily broken into a size of 50–80 mm square in the first breaking or comminuting process 12. Then, after metal is removed in the metal selection process 13, the combustible is dried in the drying process 14. Subsequently, non-combustible is removed from the combustible in the non-combustible separation process 15. Furthermore, after the combustible is secondarily broken down in the second breaking or comminuting process 16, it is separated into fluff of a size of 5 mm square or less and coarse combustible of more than a size of 5 mm square in the classification process 17.

The coarse combustible is supplied from the coarse combustible supply line 22 to the hopper 3 of the refuse incinerator 1, and then fed onto the fire grate 2 for flat bed combustion. Since the non-combustible separated in the non-combustible separation process 15 contains a small amount of combustible, it is supplied from the non-combustible supply line 21 to the hopper 3, and incinerated together with the coarse combustible. Sometimes, part or all of the coarse combustible is fed again to the second breaker or comminutor 16a through the rebreaking line 23 for further breaking.

In addition, the fluff is supplied as fuel from the fine combustible incineration supply line 24A to the combustion fluff burner 5, and blown into the secondary combustion chamber 7 for suspended combustion. At this moment, oxygen-enriched air is supplied from the oxygen concentrator 31 to a point downstream of the combustion fluff burner 5 through the combustion-enriched air supply line 32A, and blown into the secondary combustion chamber 7 from the secondary air nozzle 6 for secondary combustion. This lowers concentration of NOx, and promotes agitation and mixing with the fuel for efficient combustion.

Incineration residue discharged from the refuse incinerator 1 is supplied to the ash fusion furnace 8. Then, the fluff is supplied to the fusion fluff burner 9 through the fine combustible fusion supply line 24B, and burned together with oxygen-enriched air which is supplied to the burner 9 through the fusion enriched air supply line 32B. The heat heats and melts the incineration residue to form molten slag. The molten slag is cooled in the slag cooling chamber 10 to produce granulated slag. Fluff having the size of 1 mm square or less can be burned in the normal oxygen concentration. However, since the fluff is burned with oxygen-enriched combustion air concentrated to about 30% it can be burned even if it is 5 mm square or less. In addition, it can be burned at a higher temperature, and flame can be stabilized so that combustion efficiency can be improved. Furthermore, since the amount of exhaust gas can be reduced by about 30%, it is possible to improve the heat efficiency and to reduce the size of an exhaust gas treatment facility. In addition, fuel may be mixed in the fluff as auxiliary fuel, and burned in the fusion fluff burner 9.

Exhaust gas exhausted from the refuse incinerator 1 is discharged from the superheater 42 through the exhaust gas treatment unit. Then, steam obtained from the superheater 42 is superheated to steam having a higher temperature by the independent superheater 43, supplied to the steam turbine 44, and used by the generator 45 for electric power generation. In the independent superheater 43, the fluff is supplied through the fine combustible superheating supply line 24C, and burned in the superheating fluff burner 43a with oxygen-enriched combustion air supplied from the oxygen concentrator 31 through the superheating enriched air supply line 32C. Steam is superheated by the heat therefrom. Since the fluff is burned in oxygen-enriched combustion air concentrated to an oxygen concentration of about 30%, even fluff of 5 mm square or less in size can be burned, whereby combustion can be performed at a higher temperature and flame can be stabilized, so that the combustion efficiency can be improved. Furthermore, since the amount of exhaust gas can be reduced by about 30%, it is possible to improve the heat efficiency and reduce the size of the exhaust gas treatment facility. Of course, fuel may be mixed as auxiliary fuel for the fluff, and burned in the superheating fluff burner 43a.

According to the above embodiment, (1) Since coarse combustible, and combustible accompanied by non-combustible, are burned by flat bed combustion in the fire grate 2 of the primary combustion chamber 4, and burned in suspended combustion in the secondary combustion chamber 7 by the combustion fluff burner 5 with the fluff as fuel, even refuse containing 30% by weight or more of plastics can be burned without any trouble. In addition, refuse can be disposed of by incineration at the rate of 1,000 tons/day or more without limitation of the strength of the fire grate 2.

(2) Since the fluff is burned by supplying oxygen-enriched combustion air, concentrated to an oxygen concentration of about 30%, to the secondary air nozzle 6 and the fusion fluff burner 9, fuel for the ash fusion furnace 8 can be significantly reduced. In addition, the fluff can be burned without breaking it down to 1 mm square or less, so that the operating cost can be significantly reduced. Furthermore, the amount of exhaust gas can be reduced by about 30%, so that the processing capacity of the treatment facility for exhaust gas can be reduced.

(3) Since, in the electric power generation facility 41, the superheating fluff burner 43a is installed on the independent superheater 43 and supplied with oxygen-enriched combustion air concentrated to oxygen concentration of about 30% to burn the fluff, fuel for the independent superheater 43 can be significantly reduced. In addition, the oxygen-enriched combustion air can burn fluff even of a size of 5 mm square or less, and reduce the amount of exhaust gas by about 30% with efficient combustion. Therefore, it is possible to significantly reduce the operating cost, and to lower the burden on the exhaust gas treatment facility.

Figure 2:
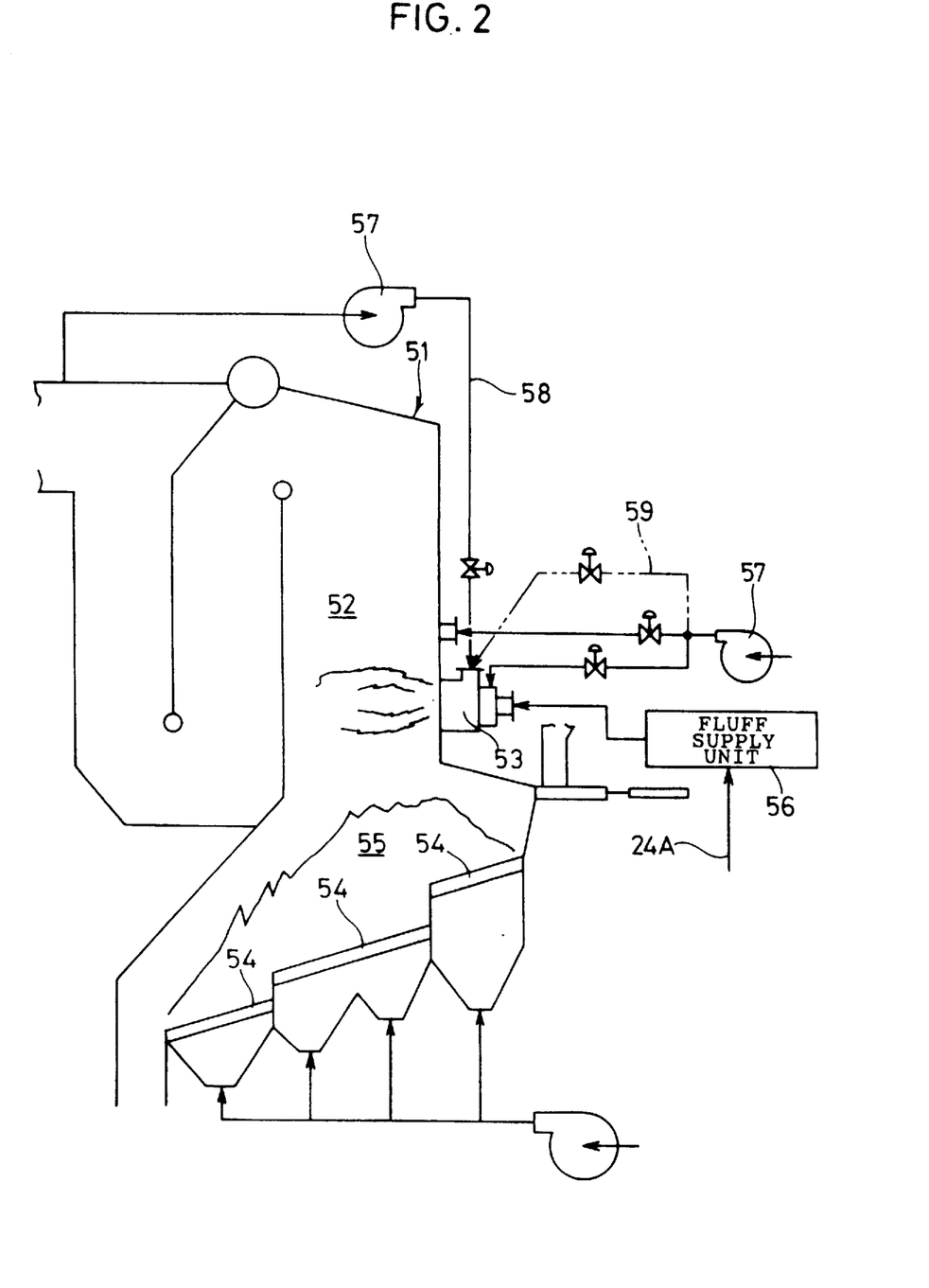
FIG. 2 is a longitudinal sectional view showing a second embodiment of a refuse incinerator employed in the refuse incineration facility.
Figure 3:
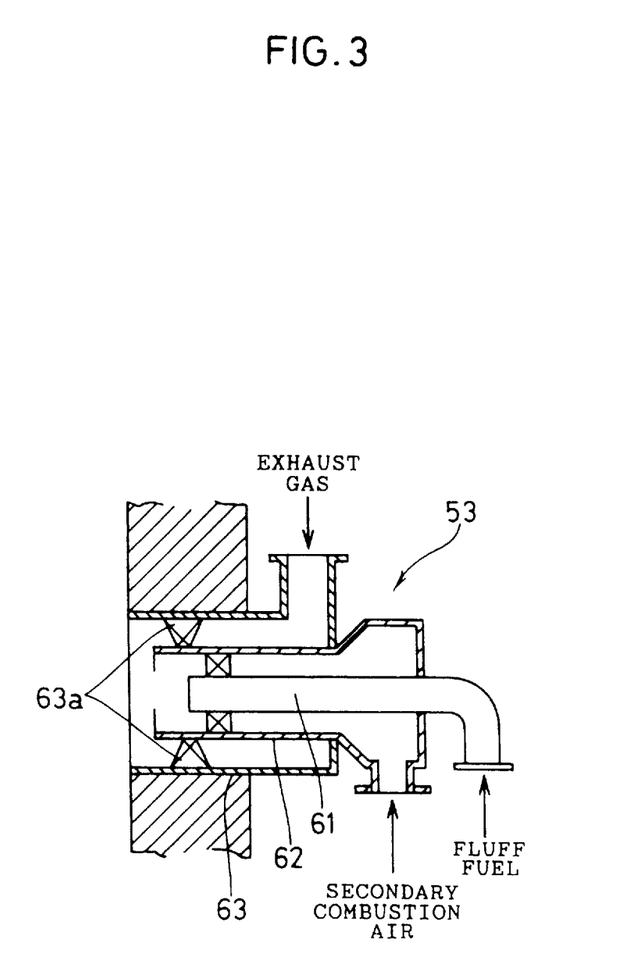
FIG. 3 is a longitudinal sectional view of a combustion fluff burner for the refuse incinerator.
Figure 4:
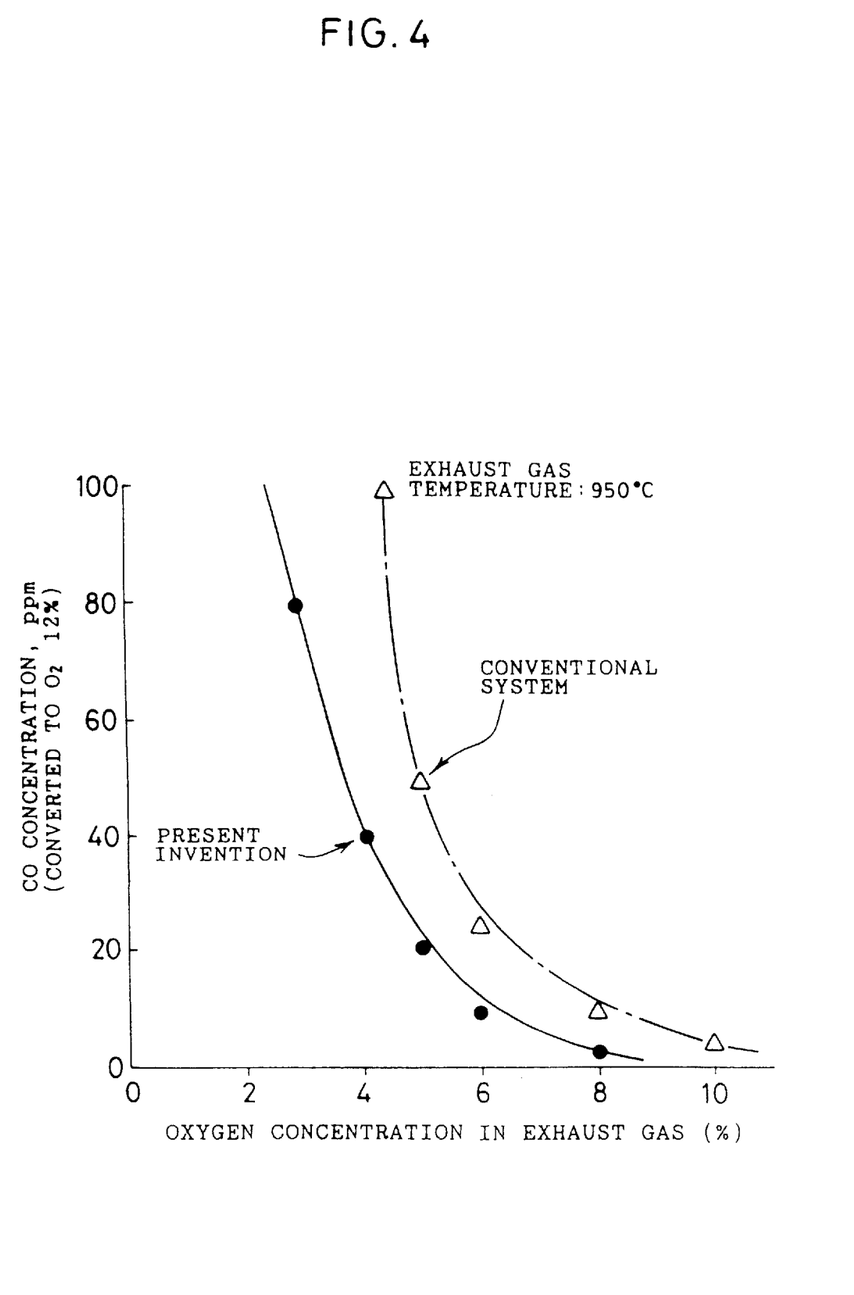
FIG. 4 is a graph showing CO concentration in the refuse incinerator.

A second embodiment of the refuse incinerator provided in the refuse incineration facility is shown in FIGS. 2–4.

This refuse incinerator 51 has a feature in a combustion fluff burner 53 provided in the secondary combustion chamber 52. When fluff is burned in the secondary combustion chamber 52 by the combustion fluff burner 53, combustion is caused only with secondary combustion. There is less mixing with combustion gas from a primary combustion chamber 55 burned on a fire grate 54, so that temperature and oxygen concentration are non-uniformly distributed. Consequently, if there arises a condition where the air ratio in the entire refuse incinerator 51 is lowered, unburned components such as CO and DXNs are generated.

To solve this problem, the combustion fluff burner 53 comprises, as shown in FIG. 3, a fluff supply tube 61 centered within an air supply tube 62 and an agitation exhaust gas supply tube 63 fitted over the air supply tube 62. The fluff supply unit 56, to which a fine combustion supply line 24A is connected, supplies a predetermined amount of fluff to the fluff supply tube 61. A secondary air fan 57 supplies secondary combustion air with ordinary oxygen concentration to the air supply tube 62 to form a secondary combustion region with fluff fuel and the secondary combustion air. Furthermore, exhaust gas, drawn by an exhaust gas fan 59 from the exhaust gas outlet of the refuse incinerator 1, is supplied as agitation gas to the agitation gas supply tube 63 through an exhaust gas circulating pipe 58, swirled by an agitation fan 63a, and blown around the secondary combustion region.

Assuming an exhaust gas outlet temperature of about 950°, a comparison between the conventional system where no exhaust gas is blown in and the above system where exhaust gas is blown in is shown in FIG. 4. Blowing in of the exhaust gas will be seen to lower the CO concentration. Therefore, according to the above embodiment, mixture with combustion gas rising from the primary combustion chamber 55 is improved, and temperature and oxygen concentration are uniformly distributed, so that generation of unburned components such as CO and DXNs is prevented even if there is a lowering of the air ratio.

In this second embodiment, exhaust gas is used as the agitation gas. This is advantageous in that, although it requires facilities such as the exhaust gas fan 59 and the exhaust gas circulation pipe 58, there is no need to increase the capacity of exhaust gas post-treatment facility. Excessively elevated temperature in the secondary combustion chamber 52 can be effectively lowered so that it can be used for control. As shown in FIG. 2 with a phantom line, in place of the exhaust gas fan 59 and the exhaust circulation pipe 58, a secondary air fan 57 and an agitation gas supply tube 63 are connected by an air supply pipe 59 to use air in place of the exhaust gas. This is advantageous in the facility cost.

Figure 5:
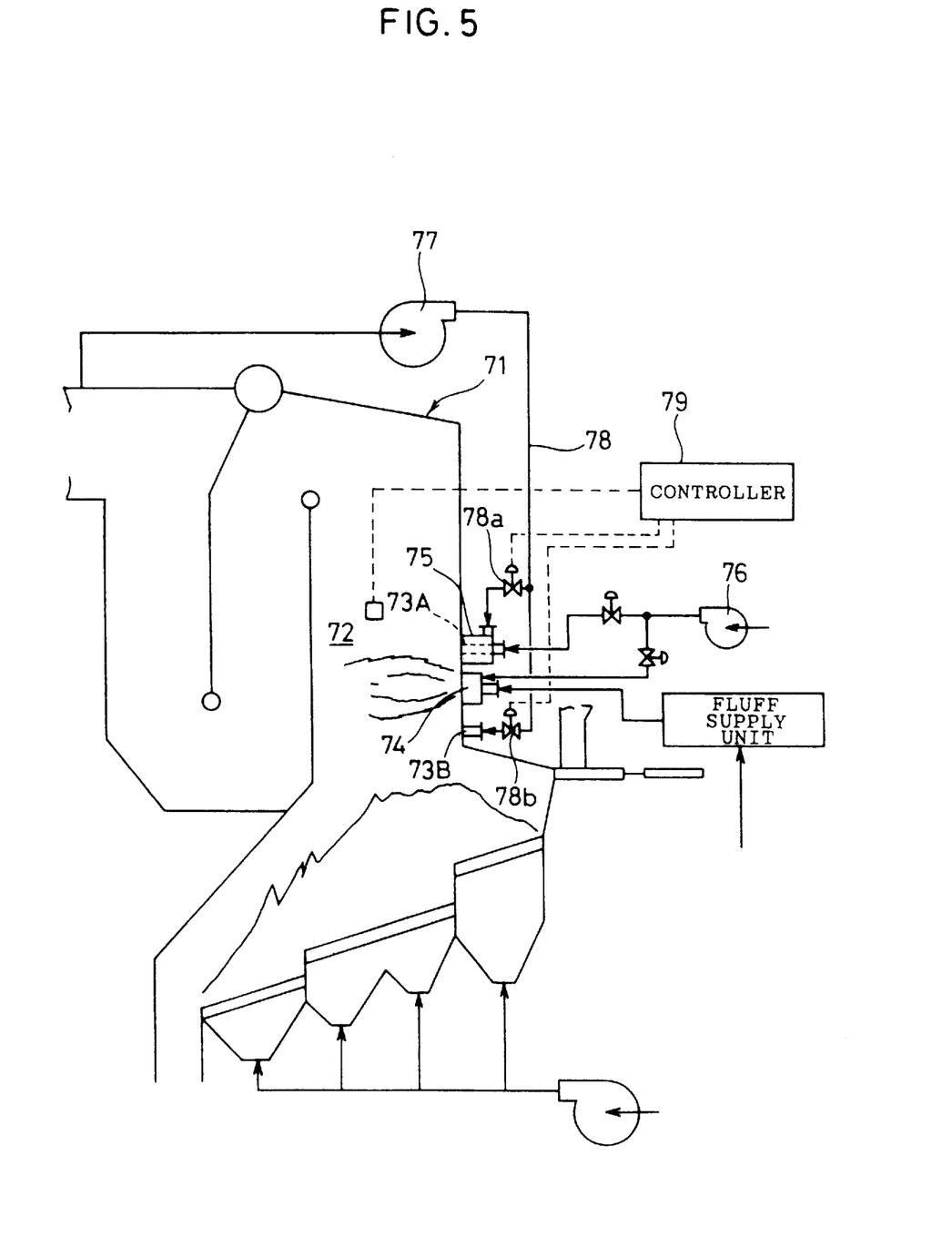
FIG. 5 is a longitudinal sectional view showing a third embodiment of a refuse incinerator employed in the refuse incineration facility.
Figure 6:
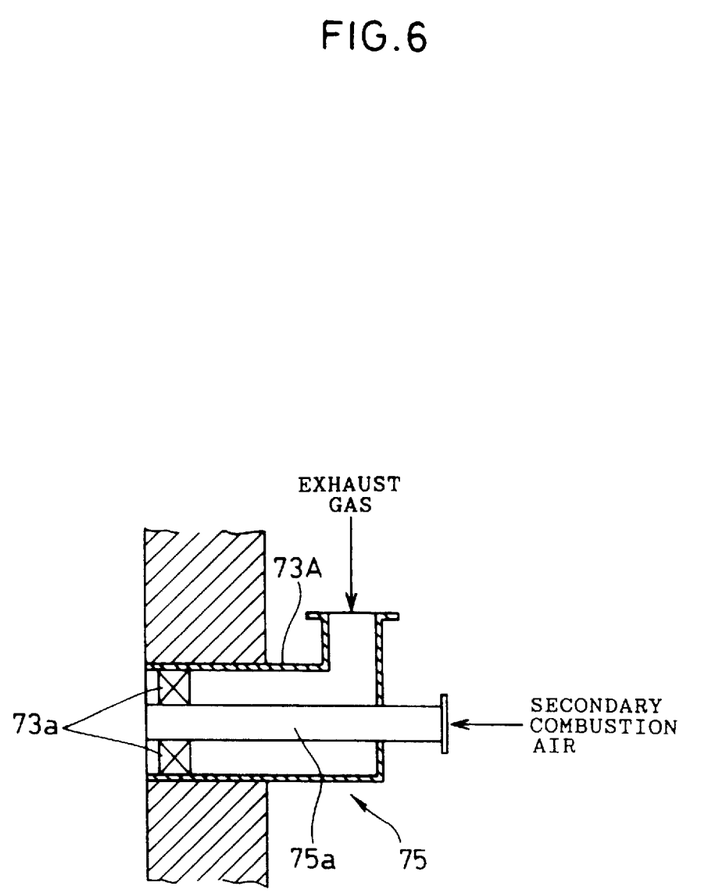
FIG. 6 is a longitudinal sectional view showing a secondary air nozzle of the refuse incinerator.

A third embodiment of the refuse incinerator provided in the refuse incineration facility is shown in FIGS. 5 and 6.

This refuse incinerator 71 is characterized by cooling gas nozzles 73A and 73B provided in a secondary combustion chamber 72. That is, when fluff is burned in the secondary combustion chamber 72 by a combustion fluff burner 74, temperature in the secondary combustion chamber 72 rises to increase the generation of NOx and to generate slugging.

To solve this, as shown in FIG. 6, a secondary combustion air nozzle 75 is provided comprising an air supply tube 75a disposed at the center of a cooling gas nozzle 73A over which a swirl fin 73a is fitted and mounted. In addition, another cooling gas nozzle 73B is provided below the combustion fluff burner 74. Then, post combustion air is supplied from an air supply fan 76 to the air supply tube 75a and blown into the secondary combustion chamber 72, exhaust gas drawn from the exhaust gas outlet of the refuse incinerator 71 by an exhaust gas fan 77 being supplied to the cooling gas nozzles 73A and 73B through the exhaust gas circulation pipe 78 and blown into the secondary combustion chamber 72. The amount of exhaust gas supplied from the exhaust circulation pipe 78 is controlled by operating exhaust gas control valves 78a and 78b with a controller 79 based on a value detected by a temperature detector which detects the temperature of the secondary combustion chamber 72, so that the temperature of the secondary combustion chamber 72 is adequately controlled.

According to the above embodiment, since the exhaust gas and the air are separately supplied and mixed in the secondary combustion chamber 72, instead of previously mixing and supplying them, the amount of the exhaust gas to be mixed can be sufficiently assured, so that temperature can be effectively controlled in the secondary combustion chamber 72. In addition, since exhaust gas is utilized, there is no need to change specifications of the exhaust gas treatment facility, such as its capacity.

Figure 7:
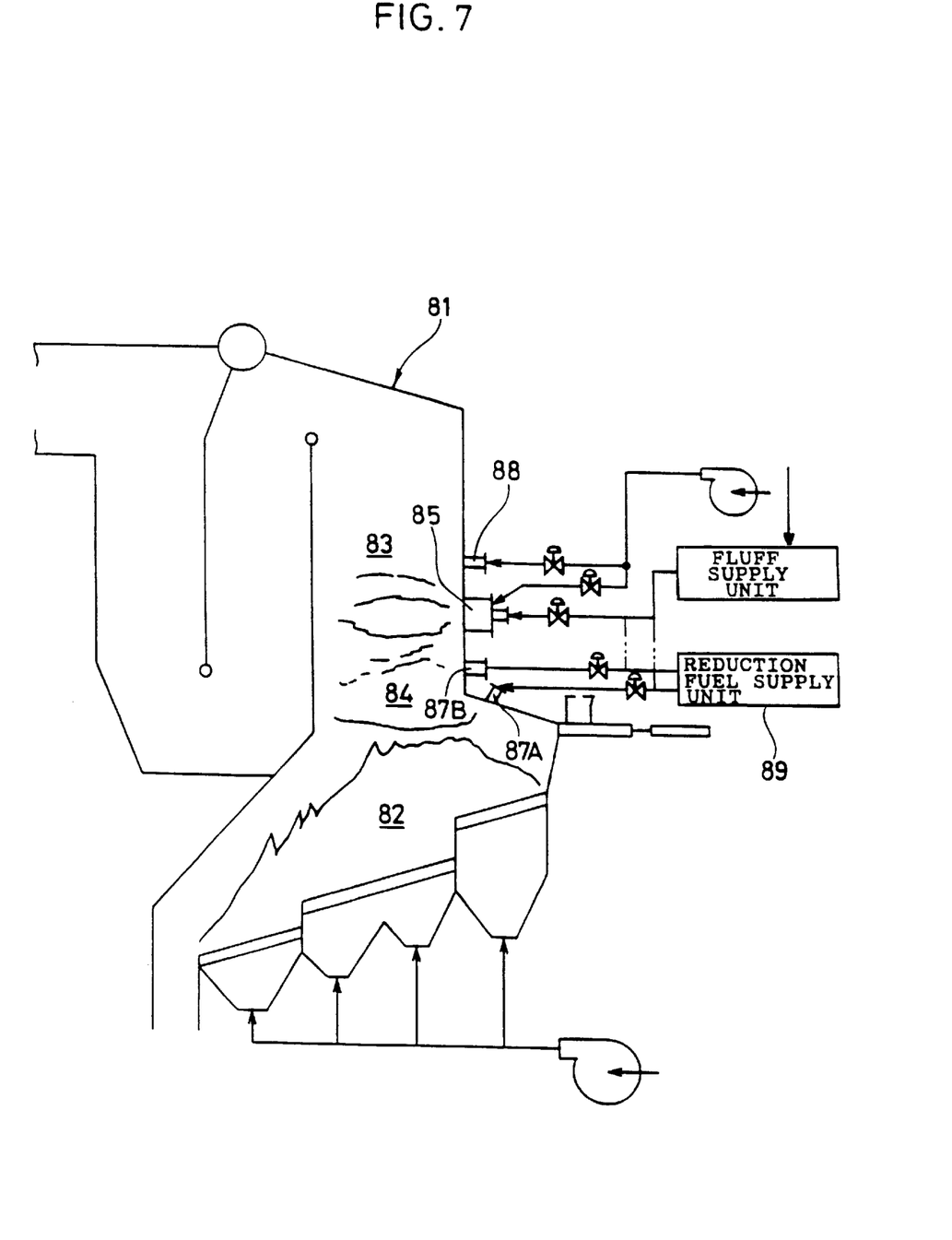
FIG. 7 is a longitudinal sectional view showing a fourth embodiment of a refuse incinerator employed in the refuse incineration facility.
Figure 8:
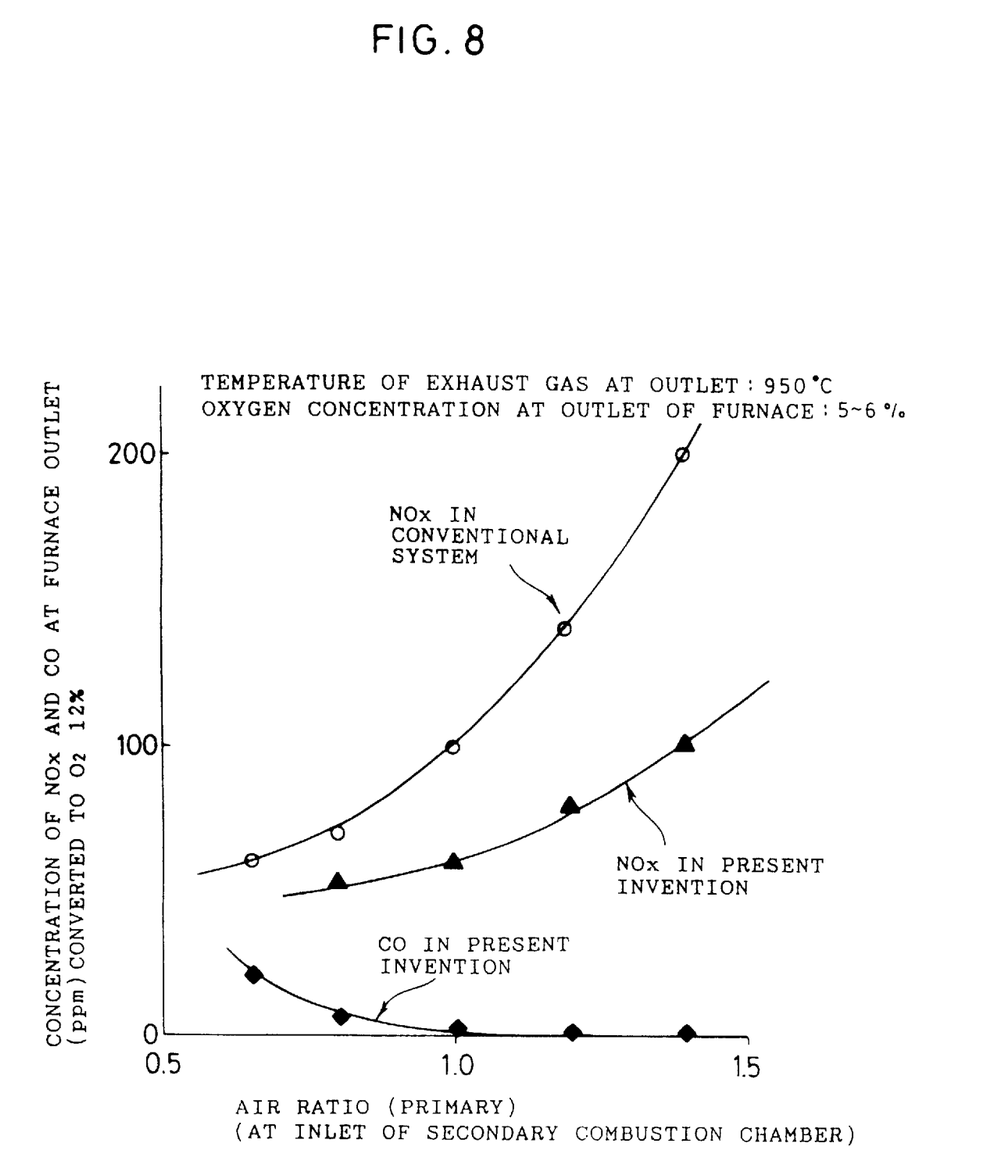
FIG. 8 is a graph showing NOx and CO concentration in the refuse incinerator.

A fourth embodiment of the refuse incinerator provided in the refuse incineration facility is shown in FIGS. 7 and 8.

This refuse incinerator 81 is characterized in that a reduction combustion region 84 is formed between a primary combustion chamber 82 and a secondary combustion chamber 83 to perform a three stage combustion. That is, when fluff is burned in the secondary combustion chamber 83 with a combustion fluff burner 85, combustibility is improved in the primary combustion chamber 82 and a rise in temperature occurs in the secondary combustion chamber 83, leading to a problem that NOx is increased.

To solve this problem, there is provided a plurality of reduction fuel nozzles 87A and 87B upstream of the combustion fluff burner 85 and between the primary and secondary combustion chambers 82 and 83. The nozzles blow reduction fuel into the furnace from a reduction fuel supply unit 89. The reduction fuel may, for example, be fluff fuel, natural gas or LPG gas. There is also provided a secondary air nozzle 88 for blowing post-combustion air.

With the above arrangement, the reduction combustion region 84 is formed downstream of the primary combustion chamber 82 by supplying reduction fuel from the reduction fuel nozzles 87A and 87B into the furnace so as to reduce NOx generated in the primary combustion chamber 82 to N2. Air ratio in the reduction combustion region 84 is set to a range of 0.65–0.90. Thus, the NOx level is lowered.

Here, if the exhaust gas outlet temperature is about 950° and oxygen concentration is 5–6%, a comparison between the conventional system where no exhaust gas is blown in and the above system shows, as shown in FIG. 8, that NOx and CO in the exhaust gas are lowered.

We claim:

1. A method for incinerating refuse comprising a preprocessing process for preprocessing combustible, said preprocessing process comprising a first comminuting step for primarily comminuting combustible into comminuted combustible; a first step for separating metal and a second step for separating non-combustible from the comminuted combustible to provide separated comminuted combustible; a second comminuting step for secondarily comminuting the separated comminuted combustible into secondarily comminuted combustible; and a classification step for classifying the secondarily comminuted combustible into coarse combustible and fine combustible; feeding the coarse combustible onto a fire grate of a refuse incinerator for combustion in a primary combustion chamber, supplying the fine combustible as fuel to a combustion burner for a secondary combustion chamber which is provided above the primary combustion chamber of the refuse incinerator, the reprocessed and produced fine combustible being supplied as a fuel to a fusion burner in an ash fusion furnace associated with the refuse incinerator.

2. The method for incinerating refuse according to claim 1, wherein secondary combustion air is supplied to the secondary combustion chamber of the refuse incinerator and primary combustion air is supplied to the combustion burner, and one of the primary combustion air and secondary combustion air is oxygen-enriched air.

3. The method for incinerating refuse according to claim 1, wherein agitation gas is blown around the secondary combustion chamber formed by the combustion burner of the refuse incinerator, and combustion exhaust gas discharged from the refuse incinerator or air is used as the agitation gas.

4. The method for incinerating refuse according to claim 1, wherein post-combustion gas is blown downstream of the secondary combustion chamber of the refuse incinerator from a secondary combustion air nozzle, and a combination of combustion exhaust gas and air is used as the post-combustion air.

5. The method for incinerating refuse according to claim 1, wherein reduction fuel is supplied to a reduction combustion region between the primary combustion chamber on a fire grate of the refuse incinerator and the secondary combustion chamber having a combustion burner.

6. The method for incinerating refuse according to claim 1 wherein the fine combustible is supplied as fuel to a superheating burner of an independent superheater in an electric power generation facility also provided in the refuse incinerator.

7. The method for incinerating refuse according to claim 6, wherein combustion air is supplied to the superheating burner of the superheater and wherein said combustion air is oxygen-enriched air.

8. The method for incinerating refuse according to claim 1, wherein combustion air is supplied to the fusion burner in the ash fusion furnace and wherein said combustion air is oxygen-enriched air.

9. An incineration facility comprising a preprocessing facility comprising a first comminutor for comminuting combustible into comminuted combustible, a sorter for sorting metal from the comminuted combustible, a separator for separating non-combustibles from the comminuted combustible, a secondary comminutor for secondarily comminuting the comminuted combustible after the separation from the non-combustible, and a classifier for classifying the secondarily comminuted combustible into coarse combustible and fine combustible; a refuse incinerator formed with a primary combustion chamber on a fire grate and with a secondary combustion chamber above the primary combustion chamber; a coarse combustible supply line for supplying the coarse combustible separated by said classifier to the primary combustion chamber of the refuse incinerator; and a fine combustible incineration supply line for supplying as fuel said fine combustible to a combustion burner mounted in the second combustion chamber of the refuse incinerator, an ash furnace equipped with a fusion burner for heating and melting incineration residue discharged from the refuse incinerator to thereby produce slag, and a fine combustible fusion supply line for supplying coarse combustible separated by the classification process as fuel to the fusion burner.

10. The incineration facility according to claim 9 further comprising an electric power generation facility having an independent superheater for heating steam obtained from a boiler of the refuse incinerator, and generating electric power by driving a turbine, and a fine combustible superheating supply line for supplying coarse combustible separated by the classifier as fuel to a superheating burner of the independent superheater.

11. The incineration facility according to claim 9 further comprising, downstream of the secondary combustion chamber of the refuse incinerator, a secondary combustion air nozzle for blowing post-combustion gas, said secondary combustion air nozzle comprising an air supply tube disposed at the center of the shaft of the secondary combustion air nozzle for blowing air into the secondary combustion chamber, and a cooling gas supply tube fitted over said air supply tube for blowing the part of the exhaust gas drawn from the exhaust gas outlet of the refuse incinerator back into the secondary combustion chamber.

12. The incineration facility according to claim 9 further comprising a reduction fuel nozzle disposed between the primary combustion chamber and the secondary combustion chamber of the refuse incinerator, and a reduction combustion region between the primary and secondary combustion chambers.

\* \* \* \* \*